United States Patent [19]
Almgren et al.

[11] Patent Number: 5,574,974
[45] Date of Patent: Nov. 12, 1996

[54] ADAPTIVE CHANNEL ALLOCATION IN A MOBILE COMMUNICATIONS SYSTEM

[75] Inventors: Knut M. Almgren, Sollentuna; Claes H. Andersson, Ekerö; Carl M. Frodigh, Kista; Yngve K. Wallstedt, Solna, all of Sweden

[73] Assignee: Telefonaktiebolaget LM Ericsson, Stockholm, Sweden

[21] Appl. No.: 406,591

[22] Filed: Mar. 20, 1995

[51] Int. Cl.$^6$ .............................. H04Q 7/00; H04Q 9/00
[52] U.S. Cl. ...................... 455/33.1; 455/34.1; 455/54.1; 455/56.1
[58] Field of Search ................. 455/33.1, 33.2, 455/34.1, 54.1, 56.1, 67.3, 69; 379/59

[56] References Cited

U.S. PATENT DOCUMENTS

| | | | |
|---|---|---|---|
| 4,613,990 | 9/1986 | Halpern | 455/54.1 |
| 4,785,450 | 11/1988 | Bolgiano et al. | 370/95 |
| 5,239,682 | 8/1993 | Strawcynski et al. | 455/54.1 |
| 5,276,730 | 1/1994 | Cimini, Jr. et al. | 379/60 |
| 5,276,907 | 1/1994 | Meidan | 455/33.3 |
| 5,287,544 | 2/1994 | Menich et al. | 455/33.2 |
| 5,305,468 | 4/1994 | Bruckert et al. | 455/69 |
| 5,355,514 | 10/1994 | Borg | 455/56.1 |
| 5,448,750 | 9/1995 | Eriksson et al. | 455/56.1 |
| 5,491,837 | 2/1996 | Haartsen | 455/56.1 |

FOREIGN PATENT DOCUMENTS 0202485  11/1986  European Pat. Off. .

OTHER PUBLICATIONS

S. C. Chen et al., "On Distributed Power Control for Radio Networks", *New Orleans Supercomm/ICC '94. Serving Humanity Through Communications. 1994 IEEE International Conference on Communications*, pp. 1281–1285, vol. 3, May 1, 1994, New Orleans, Louisiana.

Y. Furuya & Y. Akaiwa, "Channel Segregation, A Distributed Adaptive Channel Allocation Scheme for Mobile Communication Systems", *Second Nordic Seminar on Digital Land Mobile Radio Communication System*, pp. 311–315, Oct. 1986, Stockholm, Sweden.

H. Eriksson & R. Bownds, "Performance of Dynamic Channel Allocation in the DECT System", *Proceedings of 41st VTC*, pp. 693–698, May 1991.

J. F. Whitehead, "Signal–Lever–Based Dynamic Power Control for Co–channel Interference Management", *Proceedings of 43rd VTC*, pp. 499–502, May 1993.

M. Almgren et al., "Capacity enhancements in a TDMA system", *Proceedings of 43rd VTC*, pp. 277–280, May 1993.

*Primary Examiner*—Reinhard J. Eisenzopf
*Assistant Examiner*—Gertrude Arthur
*Attorney, Agent, or Firm*—Burns, Doane, Swecker & Mathis, L.L.P.

[57] ABSTRACT

In a cellular communication system, a method and apparatus are provided for allocating a channel for use on a connection between a base station and a mobile station in a cell, without making measurements of downlink interference. Throughout the system, uplink and downlink power levels are regulated so that, within each cell, their sum changes by an amount whose magnitude is substantially equal to the magnitude of change in path gain between the mobile station and the base station in that cell, and which sum is opposite in sign to the amount of change in path gain. This power regulation scheme assures that there will be a strong correlation between system-wide measurements of uplink and downlink interference. Therefore, with the power regulation scheme in place, each cell determines uplink carrier to interference (C/I) ratios for the free channels available for use in the cell and selects an acceptable free channel having a C/I value that is within a predetermined acceptable range. If uplink C/I on the acceptable free channel is greater than the uplink C/I value of a channel currently assigned to a connection, then an intra-cell handover is performed so that the connection will be reassigned to the acceptable free channel. This technique is useful for providing an adaptive channel allocation scheme to systems, such as analog cellular communications systems, in which downlink interference measurements cannot be made.

12 Claims, 8 Drawing Sheets

ADAPTIVE CHANNEL ALLOCATION IN A MOBILE COMMUNICATIONS SYSTEM

BACKGROUND

The present invention relates to cellular telephone systems, and more particularly to the adaptive assignment of channels to calls in analog cellular telephone systems as well as in digital systems having limited downlink interference measurement resources.

In cellular telephone communications systems (henceforth referred to as "cellular systems", or simply "systems"), it is important to maximize traffic-handling capacity, because the demand for such capacity continues to increase. One factor that affects capacity is the way the totality of available communication channels are allocated for use by particular cells within the system. The use of the same channel by two or more cells that are in relatively close proximity to one another can cause each cell to experience too much co-channel interference, and should therefore be avoided.

One solution for avoiding co-channel interference is to have each cell operate on a dedicated group of channels that are not used by any other cell in the system. Although this strategy successfully avoids the occurrence of co-channel interference, it limits the system's traffic-handling capacity to the number of channels that the system is permitted to use.

In order to increase the system's traffic-handling capacity, it is possible to devise a reuse plan whereby any one channel may be concurrently used by two or more cells. Co-channel interference is limited by ensuring that the one channel is allocated to cells that are geographically located far enough apart (referred to as the "reuse distance") so as not to severely interfere with one another. The appropriate distance for limiting interference will depend upon factors that affect the carrier to interference. ratio (C/I) on that particular channel in each cell.

A number of techniques have been devised for selecting and assigning traffic channels in a way that reduces the likelihood of co-channel interference in a cellular communication system using a fixed channel reuse plan, that is, a plan that does not change over time. The publication V. H. MacDonald, "Advanced Mobile Phone Service: The Cellular Concept", *Bell System Technology Journal*, pp. 15–41, January 1979, describes such a plan.

Fixed channel reuse plans are based upon assumptions about propagation conditions in order to guarantee minimum C/I in the system. However, such plans are very difficult and tedious to make, and these difficulties increase as the cells become smaller. Furthermore, the number of calls that are handled by any given cell may increase or decrease over time. Because of such evolving traffic patterns, not to mention the evolution of the system itself, cellular systems that utilize fixed channel reuse plans may suffer a degradation in traffic-handling capacity over time.

To avoid such degradation, an adaptive channel allocation (ACA) plan is preferable to a fixed channel reuse plan. In an ACA plan, as the name implies, the utilization of radio resources in the system adapts over time in order to accommodate changes in the current traffic and propagation situation. The adaptation is made on the basis of system measurements that are at least periodically made. The goal, in such a scheme, is to allocate channels so that all links have satisfactory quality. A common feature of ACA systems is that they allocate a channel out of a set of channels which fulfills some predetermined quality criteria. However, different ACA schemes utilize different criteria for selecting channels from the set.

The general concept underlying ACA systems is well-known to those having ordinary skill in the art. For example, H. Eriksson, "Capacity Improvement by Adaptive Channel Allocation", *IEEE Global Telecomm. conf.*, pp. 1355–1359, Nov. 28–Dec. 1, 1988, illustrates the capacity gains associated with a cellular radio system where all of the channels are a common resource shared by all base stations. In the above-referenced report, the mobile measures the signal quality of the downlink, and channels are assigned on the basis of selecting the channel with the highest carrier to interference ratio (C/I level).

A different approach is described by G. Riva, "Performance Analysis of an Improved Dynamic Channel Allocation Scheme for Cellular Mobile Radio Systems", *42nd IEEE Veh. Tech. Conf.*, pp. 794–797, Denver, 1992, where the channel is selected based on achieving a quality close to or slightly better than a required C/I threshold. Also, Y. Furuya et al., "Channel Segregation, A Distributed Adaptive Channel Allocation Scheme for Mobile Communications Systems", *Second Nordic Seminar on Digital Land Mobile Radio Communication*, pp. 311–315, Stockholm, Oct. 14–16, 1986, describes an ACA system wherein the recent history of link quality is considered as a factor in allocation decisions. In addition, several hybrid systems have been presented where ACA is applied to a small block of frequencies on top of a fixed channel allocation scheme. Such an example is presented in K. Sallberg et al., "Hybrid Channel Assignment and Reuse Partitioning in a Cellular Mobile Telephone System", *Proc. IEEE VTC '87*, pp. 405–411, 1987.

Apart from increases in system capacity, adaptive channel allocation obviates the need for system planning. Planning is instead performed by the system itself. This feature of ACA is particularly attractive when system changes are implemented, when new base stations are added, or when the environment changes, for example by the construction or demolition of large buildings.

It is preferable to implement ACA schemes in two parts: a "slow" part, and a "fast" part. The "slow" part determines, for each cell, a set of channels to be used based on interference and traffic fluctuations that occur over a relatively long period of time (e.g., 20–30 busy hours, which could take several weeks to occur). This eliminates the frequency planning problem, and may also adapt to average traffic loads in the system. The "fast" part is concerned with selecting at any given moment, from the slowly determined set of channels, the "best" channel for each connection, based on short term interference measurements. Implementation of both the "slow" and the "fast" parts of an ACA scheme may be distributed in the system, so that each base station determines its portion of the frequency plan as well as channel assignments based on local observations within the cell.

One reason for splitting an ACA scheme into two parts (i e., "fast" and "slow") is because of the use of auto-tuned combiners that are mechanically tuned, by means of small motors, to desired frequency ranges. Tuning is an automatic, but slow, operation that cannot be performed when a call arrives at the cell.

Furthermore, each base station is equipped with a limited number of transceivers and is therefore not capable of using all channels simultaneously. By dividing the ACA scheme into "slow" and "fast" parts, a strategy can be developed wherein the combiners are tuned to a set of frequencies that are obtained from the "slow" ACA scheme, and then the "fast" part of the ACA scheme makes its channel selection from among the "slowly" determined set of frequencies. The Y. Furuya et al. publication, cited above, describes aspects of an ACA scheme which can be categorized as "slow" and "fast", as those terms are defined here Having a slowly changing frequency plan provides an additional advantage in that it is easier to observe the interference in the system. This is important when considering the limited measurement resources in any given system.

For prior art ACA plans to work properly, it is essential that both downlink (i.e. from base station to mobile station) and uplink (i.e., from mobile station to base station) measurements of channel interference levels be made. For ACA to work at its best, accurate interference level measurements should be made on all channels.

Considering only digital cellular systems for the moment, ACA schemes are feasible because there are some resources for making both uplink and downlink measurements. Uplink measurements may be made by equipment in the base station. Downlink measurements may be made by a mobile station, which then reports its measured values back to the base station. However, it is still difficult to obtain measurements on all channels. For example, in digital systems such as D-AMPS, the mobile assisted handover (MAHO) facility is used to evaluate the downlink disturbance levels on traffic frequencies that are currently not in use in the serving cell. This MAHO measurement resource is very limited, however, because each mobile can only measure a few frequencies. As a result, it is not possible to get information about downlink interference on all frequencies in a cell within a short time frame, so the channel allocation has to be based, at least in part, on old information.

Considering now the task of devising an ACA scheme for use in analog systems, such as AMPS and TACS, one is faced with a difficult problem because analog systems typically do not have any provisions for making downlink measurements; the inability of mobile terminals to provide any information about the received downlink signal means that such systems are confined to measuring channel interference in the uplink direction only. As a result, channel allocation for analog systems has been manually planned in the prior art.

Because of the above-described benefits of utilizing ACA schemes for allocating cellular system resources, it is desirable to provide a technique that will allow such schemes to be applied in analog cellular systems as well as in digital cellular systems having very limited downlink interference measurement resources.

SUMMARY

It is therefore an object of the present invention to provide a method and apparatus for adaptively allocating channels for use in a cellular communication system, without the need for making measurements of downlink interference.

In accordance with one aspect of the present invention, the foregoing and other objects are achieved in a cellular communication system comprising first and second cells, wherein the first cell comprises a first base station and a first mobile station, and the second cell comprises a second base station and a second mobile station. Furthermore, the second cell uses any one of a plurality of channels on a second connection between the second base station and a second mobile station. A method and apparatus for allocating one of the plurality of channels for use on a first connection between the first base station and the first mobile station is provided, which method comprises, in the second cell, adjusting total power of the used one of the channels by an amount $\Delta P_2$, wherein: $\Delta P_2$ is equal to a sum of a change in transmission power of the second mobile station plus a change in transmission power of the second base station on the used one of the channels; $\Delta P_2$ has a magnitude that is substantially equal to a magnitude of a change in path gain between the second mobile station and the second base station; and $\Delta P_2$ has a sign that is opposite a sign of the change in path gain between the second mobile station and the second base station.

The power regulation aspect of the invention assures that there will be a strong correlation between system-wide uplink and downlink C/I values. Therefore, the inventive system and method further comprise, in the first cell, using determinations of uplink interference values to select an acceptable free channel from those ones of the plurality of channels that are unused in the first cell. The acceptable free channel is then allocated to the first connection.

The invention has been described above with respect to just two cells, and two connections. In a preferred embodiment of the invention, the system may of course include many more cells, each one of which regulates transmission power on all of the used connections in a similar manner to that described above with respect to the second cell. Accordingly, each of the cells would make channel allocation decisions in the manner described above with respect to the first cell.

In a preferred embodiment of the invention, adjusting total power in the second cell, for example, comprises the steps of regulating power, $P_{m2}$, in the second mobile station so that $P_{m2}=\alpha_m-\beta_m \cdot g_{22}$ $[dB]$, where $g_{22}$ is the path gain between the second mobile station and the second base station, and $\alpha_m$ and $\beta_m$ are constants; (b) regulating power, $P_{b2}$, in the second base station so that $P_{b2}=\alpha_b-\beta_b \cdot g_{22}$ $[dB]$, where $\alpha_b$ and $\beta_b$ are constants; and (c) while performing steps (a)–(b), ensuring that a sum of $\beta_b$ plus $\beta_m$ is equal to a predetermined constant that is preferably equal to 1.

In accordance with another aspect of the invention, allocating the channel to the first cell further comprises initially allocating a first one of the plurality of channels to the first connection; and, if the acceptable free channel is not the first one of the plurality of channels, then performing an intra-cell handover of the first connection from the first one of the plurality of channels to the acceptable free channel. This might be performed, for example, if the first channel has a C/I value that is less than that of the acceptable free channel. In this way, an adaptive channel allocation scheme based solely upon determinations of uplink interference values is effected, whereby an acceptable free channel can be dynamically substituted for a currently used channel whose performance is inferior to that expected from the acceptable free channel.

In accordance with yet another aspect of the invention, the step of selecting an acceptable free channel comprises the steps of determining an acceptable set of free channels having respective expected uplink C/I ratios that are within a predetermined range of C/I values; and selecting, as the acceptable free channel, a best free channel from the acceptable set of free channels, wherein the best free channel has a highest expected C/I ratio compared to other expected C/I ratios of respective other free channels in the acceptable set of free channels. This strategy permits system performance to be improved, even if a currently used channel has an acceptable uplink C/I value, by dynamically substituting therefor (by means of intra-cell handover) an even better channel.

BRIEF DESCRIPTION OF THE DRAWINGS

The objects and advantages of the invention will be understood by reading the following detailed description in conjunction with the drawings in which:

FIG. 5 is a diagram that illustrates a situation in which failure to use power regulation in accordance with the present invention results in an absence of correlation between measurements of uplink and downlink interference;

DETAILED DESCRIPTION

Figure 1:
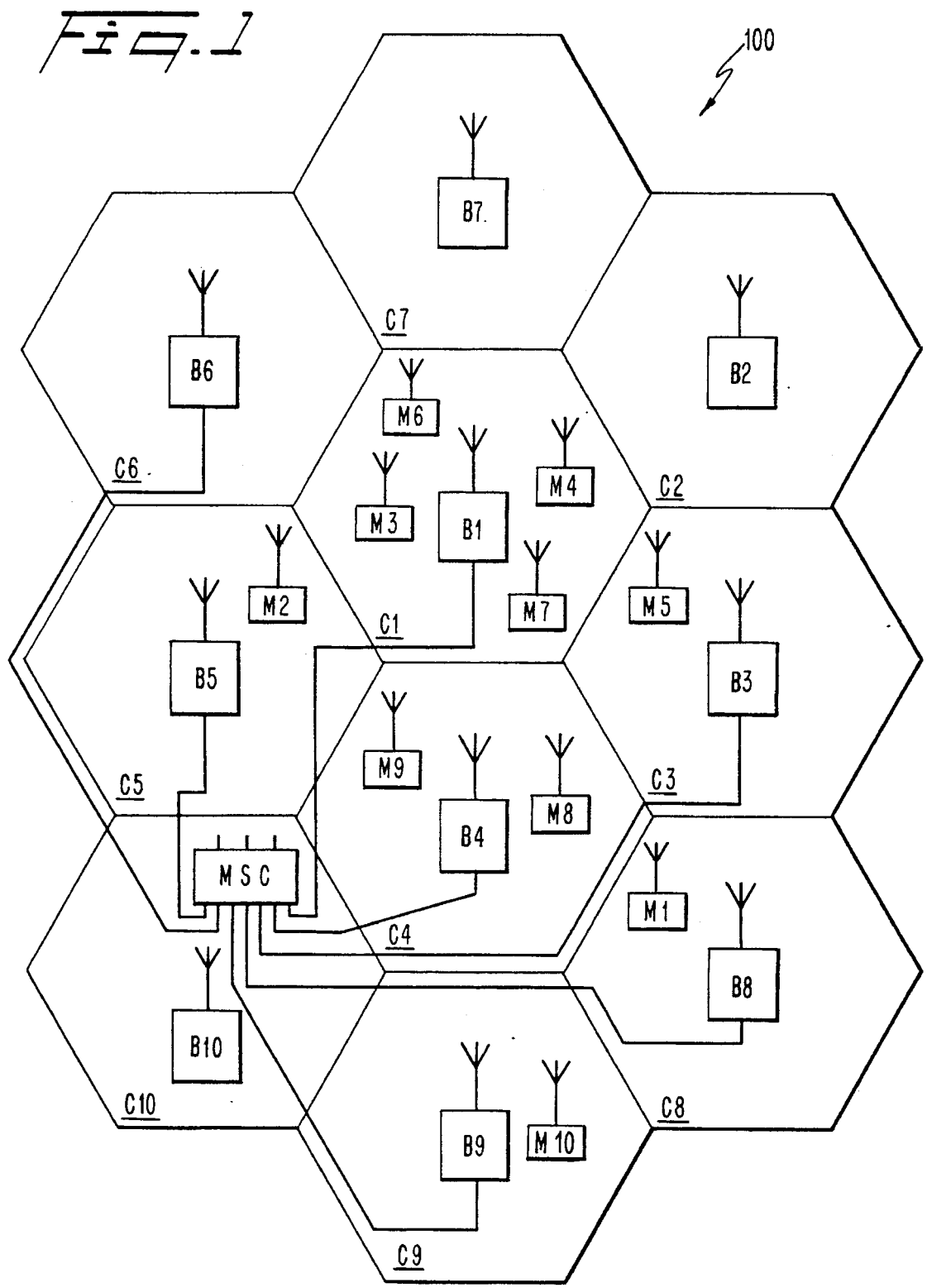
FIG. 1 is a schematic diagram illustrating ten cells in a cellular mobile radio telephone system to which the present invention applies.

The various features of the invention will now be described with respect to the figures, in which like parts are identified with the same reference characters.

FIG. 1 is a schematic diagram illustrating ten cells, C1 to C10, in a cellular mobile radio telephone system 100. Normally the method according to the present invention would be implemented in a cellular system comprising many more cells than ten. For purposes of this description, the system depicted herein is considered to be an isolated portion of a larger system which has been fragmented.

For each cell C1 to C10, there is a respective base station B1 to B10. FIG. 1 illustrates base stations situated in the vicinity of the respective cell centers and having omni-directional antennas. The base stations of adjacent cells may however be located in the vicinity of cell borders and have directional antennas.

FIG. 1 also illustrates ten mobile stations M1 to M10, which are movable within a cell and from one cell to another cell. The method according to the present invention may be implemented in a cellular mobile radio system comprising many more mobile stations than ten. In particular, there are normally many more mobile stations that there are base stations.

Also illustrated in FIG. 1 is a mobile switching center (MSC). The mobile switching center is connected to all ten illustrated base stations by cables. The mobile switching center is also connected by cables to a fixed public switching telephone network PSTN or similar fixed network with ISDN facilities. All cables from the mobile switching center to base stations and cables to the fixed network are not illustrated. Further, other media may be used instead of cables for base to mobile switching center communications, such as fixed radio links.

The cellular system 100 includes a plurality of radio channels for communication. The system is designed both for analog information and for pure digital information. Examples of analog information include speech and digitized analog information (e.g., digitized speech). In the context of the present invention, the term connection is used for a communication channel between a mobile station and another mobile station in the same system or another system, between two fixed telephones or terminals in a fixed network connected through the cellular system 100, or between a mobile station and a fixed telephone. A connection may be a call where two people talk to each other, but may also be a data communication channel where computers exchange data.

Each cellular system 100 is assigned a particular frequency band over which it can operate. A set of communication channels is allocated to each cell. For example, between ten and thirty different voice channels and one control channel may be allocated to any given cell. One criterion for allocating channels in each cell is the avoidance of excessive co-channel interference.

As described in the BACKGROUND section of this disclosure, it is desirable to utilize an ACA scheme for dynamically determining how channels in the system will be allocated to one or more of the cells. However, in the past such schemes have needed to rely on measurements of both uplink and downlink interference, which is problematic in systems that provide only for uplink measurements, such as analog cellular communications systems or digital cellular communications systems having a limited amount of measurement resources.

To overcome this obstacle, the present invention adopts a strategy in which transmission power is controlled in a manner, to be described below, that causes a strong correlation to exist between uplink and downlink interference values. Once it is known that such a correlation exists, an ACA scheme may then be applied, with allocation decisions being made solely on uplink measurements. As a result, the ACA scheme may be applied to systems, such as analog systems, in which downlink measurements cannot be made.

Figure 2:
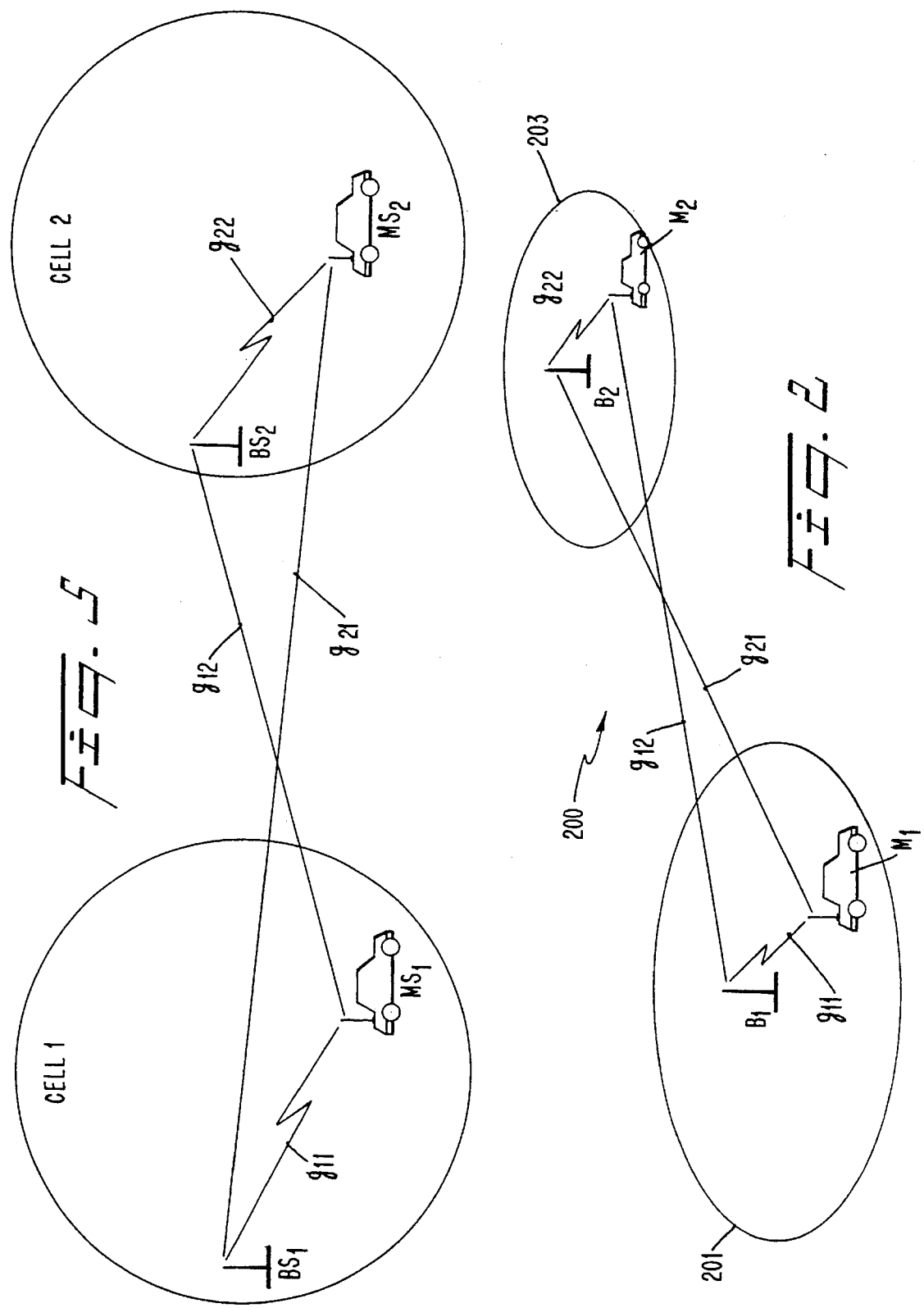
FIG. 2 is a diagram of first and second cells in an analog cellular communication system to which the present invention applies.

The power control strategy will now be described in detail, with reference to FIG. 2, which illustrates first and second cells 201, 203 in an analog cellular communication system 200. In general, a snapshot of the traffic and propagation situation in a cellular system is fully described by the gain matrix defined as $$G=[g_{ij}] \quad (1)$$

where $g_{ij}$ is the path gain in dB from mobile station i to base station j. It is preferable, in this analysis, to work with the path gain instead of the more commonly used path loss, but expressed in dB there is only a change of sign. It is assumed for purposes of illustration that each mobile station is connected to the strongest received base station and assigned a channel. However, those having ordinary skill in the art will recognize that this is not a necessity.

In addition to base and channel assignment, a transmission power level (henceforth just "power level") for each mobile station and base station has to be decided. A preferred embodiment of the invention utilizes signal-level-based power control (PC) methods for each of the uplinks and downlinks as fully described in J. F. Whitehead, "Signal-Level-Based Dynamic Power Control for Co-channel Interference Management," *Proceedings of 43rd VTC*, pp. 499–502, May 1993, which is incorporated herein by reference in its entirety.

To define the power control aspect of the present invention, the discussion will now focus on those cells within the system that each have a connection supported by the same channel. Mobile stations and base stations that utilize this channel will be assigned reference numbers in a manner that results in mobile station i being connected to base station i. With this numbering scheme, the path gain in the used link will be denoted $g_{ii}$ and the power used by mobile station i in the uplink is given by the expression $$P_{mi} = \alpha_m - \beta_m \cdot g_{ii} \ [dB], \tag{2}$$

where, preferably, $\beta_m \in [0,1]$, although values outside this range may be acceptable, and where $\alpha_m$ is a constant in dB. No power regulation (i.e., constant transmitted power) corresponds to $\beta_m = 0$ and full power control (i.e., constant received power) corresponds to $\beta_m = 1$. The constant $\alpha_m$ is adjusted depending on the cell sizes in the system and the background noise.

Correspondingly, in the downlink the base station regulates its power according to the expression $$P_{bi} = \alpha_b - \beta_b \cdot g_{ii} \ [dB]. \tag{3}$$

Considering now the situation illustrated in FIG. 2, in which there are only two connections, the expressions for the carrier to interference ratio (C/I) values for the different involved links are as follows.

In the downlink to $M_1$ (all values in dB):

$$\left(\frac{C}{I}\right)_{M_1} = P_{b1} + g_{11} - P_{b2} - g_{12}. \tag{4}$$

Inserting the expressions for $P_{b1}$ and $P_{b2}$ gives:

$$\left(\frac{C}{I}\right)_{M_1} = \alpha_b - \beta_b \cdot g_{11} + g_{11} - \alpha_b + \beta_b \cdot g_{22} - g_{12}, \tag{5}$$

which can be simplified to $$\left(\frac{C}{I}\right)_{M_1} = (1 - \beta_b) \cdot g_{11} + \beta_b \cdot g_{22} - g_{12}. \tag{6}$$

Correspondingly in the uplink to $B_2$:

$$\left(\frac{C}{I}\right)_{B_1} = P_{m2} + g_{22} - P_{m1} - g_{12}. \tag{7}$$

Inserting the values for $P_{m1}$ and $P_{m2}$ gives:

$$\left(\frac{C}{I}\right)_{B_2} = \alpha_m - \beta_m \cdot g_{22} + g_{22} - \alpha_m + \beta_m \cdot g_{11} - g_{12} \tag{8}$$

which can be simplified to $$\left(\frac{C}{I}\right)_{B_2} = (1 - \beta_m) \cdot g_{22} + \beta_m \cdot g_{11} - g_{12}. \tag{9}$$

Comparing Eqs. (6) and (9) we see that the same C/I in $M_1$ and $B_2$ is achieved if $$\beta_b + \beta_m = 1. \tag{10}$$

The important observation is that C/I in the up-and downlinks are correlated through the crosslink $g_{12}$. The same result can of course also be derived for $M_2$ and $B1$ which are correlated through the crosslink $g_{21}$.

The effect of operating a system that satisfies Eq. (10) can be seen by considering the effect that a change in path gain within cell i (i.e., $\Delta g_{ii}$) has on the total power, $P_i$, that is used within that connection within that cell, where $$P_i = P_{bi} + P_{mi}. \tag{11}$$

Since we are interested in determining how a change in total power, $\Delta P_i$ is related to a change in path gain, $\Delta g_{ii}$, it will be useful, for the moment, to write each variable as a function of time, t. Thus, the following equation is generated:

$$P_i(t) = P_{mi}(t) + P_{bi}(t) = \alpha_b - \beta_b \cdot g_{ii}(t) + \alpha_m - \beta_m \cdot g_{ii}(t) = (\alpha_b + \alpha_m) - g_{ii}(t) \cdot (\beta_b + \beta_m) \tag{12}$$

where $P_{bi}(t)$ is the transmission power of the base station in cell i at time t, $P_{mi}(t)$ is the transmission power of the mobile station in cell i at time t, and $g_{ii}(t)$ is the path gain between the mobile and the base station in cell i at time t. Note that $\alpha_b$, $\alpha_m$, $\beta_b$ and $\beta_m$ are constants, and are therefore not expressed as functions of t.

When $\beta_b + \beta_m = 1$, Eq. 12 reduces to $$P_i(t) = P_{mi}(t) + P_{bi}(t) = (\alpha_b + \alpha_m) - g_{ii}(t) \tag{13}$$

Furthermore, the change in total power, $\Delta P_i$, is given by the equation $$\Delta P_i = P_i(t + \Delta t) - P_i(t) \tag{14}$$

where $\Delta t$ is a time increment.

Substituting values from Eq. 13 into Eq. 14 gives $$\begin{aligned}\Delta P_i &= [P_{mi}(t + \Delta t) + P_{bi}(t + \Delta t)] - [P_{mi}(t) + P_{bi}(t)] \\ &= [(\alpha_b + \alpha_m) - g_{ii}(t + \Delta t)] - [(\alpha_b + \alpha_m) - g_{ii}(t)] \\ &= -g_{ii}(t + \Delta t) + g_{ii}(t) \\ &= -[g_{ii}(t + \Delta t) - g_{ii}(t)] \\ &= -\Delta g_{ii} \end{aligned} \tag{15}$$

It follows from Eq. (15) that, when $\beta_m + \beta_b = 1$, $$\Delta P_i + \Delta g_{ii} = 0 \tag{16}$$

The meaning of the above analysis, for the special case of just two connections within the system occurring on the same channel, is that the uplink C/I in, for example, cell 1 can be made equal to the downlink C/I in cell 2 by controlling the total power, $P_i$, in cell i so that any change in cell 1's path gain (i.e., $\Delta g_{11}$) is exactly offset by a change in total transmission power in cell 1 (i.e., $\Delta P_1$). In a preferred embodiment of the invention, in which power is controlled in accordance with Eqs. (2) and (3), this is accomplished by ensuring that $\beta_b + \beta_m = 1$. However, alternative embodiments of the invention may also be used in systems that do not regulate power linearly in accordance with Eqs. (2) and (3). In such cases, one can induce the correlation between system-wide uplink and downlink C/I values by taking whatever steps are necessary for ensuring that Eq. (16) is at least substantially satisfied.

The preceding analysis showed that, in the special case of only two connections using the same channel, the uplink C/I value at the base station $B_2$ can be made exactly equal to the downlink C/I value at the mobile station $M_1$ by appropriate control of mobile and base station transmission power. In the more general case in which more than two connections in the system utilize the same channel, it is not possible to guarantee that for any uplink C/I value there is a mobile station in the system having an identical downlink C/I value. Nonetheless, a strong correlation between these two values can be made to exist, as will be shown by the following analysis.

As explained above, a snapshot of the traffic and propagation situation in a cellular system is fully described by the gain matrix defined by Eq. (1), which is repeated here:

$$G = [g_{ij}], \quad (1)$$

where $g_{ij}$ is the path gain from mobile station i to base station j. For purposes of the following analysis, all calculations will be made in Watts instead of dB, as was used in the previous discussion. The reason for this choice is to enable the summation of interference from different sources.

The inventive channel assignment method will subdivide the mobile stations in correspondence with the available channels. Assume that Q mobile stations, each connected to a corresponding one of Q different base stations, are assigned the same one of the available channels, which will be designated here as channel k. In the following analysis, the mobile stations and the base stations will be numbered in such a way that the mobile stations, that are each assigned to the same channel k, are numbered 1 to Q in correspondence with the base stations 1 to Q to which they are respectively connected.

The path gains between the Q base stations and the Q mobile stations form a sub gain matrix $g_k$ with dimension (Q×Q). The diagonal elements in $g_k$ are thus the path gains in the own link and the off diagonal elements are the cross links.

The power vectors will now be defined. In the uplink (transmitter powers used by mobile stations), the power vector is given by $$P_m = \begin{bmatrix} P_{m1} \\ \cdot \\ \cdot \\ \cdot \\ P_{mQ} \end{bmatrix}, \quad (17)$$

and in the down-link (transmitter power used by base stations), the power vector is given by $$P_b = \begin{bmatrix} P_{b1} \\ \cdot \\ \cdot \\ \cdot \\ P_{bQ} \end{bmatrix}. \quad (18)$$

From these definitions it is straightforward to compute the C/I, denoted Γ, in the uplink (at BS j from MS j):

$$\Gamma_j = \frac{g_{jj} \cdot P_{mj}}{\sum_i g_{ij} \cdot P_{mi} - g_{jj} \cdot P_{mj}} \quad (19)$$

Correspondingly, C/I in the downlink (at MS i from BS i) is given by the expression $$\Gamma_i = \frac{g_{ii} \cdot P_{bi}}{\sum_j g_{ij} \cdot P_{bj} - g_{ii} \cdot P_{bi}} \quad (20)$$

Expressed in Watts, the uplink power control is given by the expression $$P_{mi} = \alpha_m \cdot (g_{ii})^{-\beta_m} \quad (21)$$

and in the downlink it is given by the equation $$P_{bj} = \alpha_b \cdot (g_{jj})^{-\beta_b}. \quad (22)$$

Combining Eqs. (19) and (21) gives C/I in the uplink (at BS j from MS j)

$$\Gamma_j = \frac{g_{jj} \cdot \alpha_m \cdot g_{jj}^{-\beta_m}}{\sum_i g_{ij} \cdot \alpha_m \cdot g_{ii}^{-\beta_m} - g_{jj} \cdot \alpha_m \cdot g_{jj}^{-\beta_m}} = \frac{1}{\sum_i \frac{g_{ij}}{g_{ii}^{\beta_m} \cdot g_{jj}^{(1-\beta_m)}} - 1}, \quad (23)$$

and combining Eqs. (20) and (22) gives the downlink C/I (at MS i from BS i) as $$\Gamma_i = \frac{g_{ii} \cdot \alpha_b \cdot g_{ii}^{-\beta_b}}{\sum_j g_{ij} \cdot \alpha_b \cdot g_{jj}^{-\beta_b} - g_{ii} \cdot \alpha_b \cdot g_{ii}^{-\beta_b}} = \frac{1}{\sum_j \frac{g_{ii}}{g_{ii}^{(1-\beta_b)} \cdot g_{jj}^{\beta_b}} - 1}. \quad (24)$$

The denominators in Eqs. (23) and (24) have similarities, and for the case when $$\beta_m + \beta_b \cong 1 \quad (25)$$

the elements $g_{ij}$ in Eqs. (23) and (24) are normalized with the same factors. This can also be expressed in matrix form. The denominators in Eqs. (23) and (24) are column sums and row sums of the following matrix $$D = \begin{bmatrix} \frac{1}{g_{11}^{\beta_m}} & 0 & \cdots & 0 \\ 0 & \frac{1}{g_{22}^{\beta_m}} & \cdots & \cdots \\ \cdots & \cdots & \cdots & \cdots \\ 0 & \cdots & \cdots & \frac{1}{g_{QQ}^{\beta_m}} \end{bmatrix} \times G \times \begin{bmatrix} \frac{1}{g_{11}^{\beta_b}} & 0 & \cdots & 0 \\ 0 & \frac{1}{g_{22}^{\beta_b}} & \cdots & \cdots \\ \cdots & \cdots & \cdots & \cdots \\ 0 & \cdots & \cdots & \frac{1}{g_{QQ}^{\beta_b}} \end{bmatrix} - I \quad (26)$$

which can be simplified to $$D = \begin{bmatrix} 0 & \frac{g_{12}}{g_{11}^{\beta_m} \cdot g_{22}^{\beta_b}} & \cdots & \frac{g_{1Q}}{g_{11}^{\beta_m} \cdot g_{QQ}^{\beta_b}} \\ \frac{g_{21}}{g_{22}^{\beta_m} \cdot g_{11}^{\beta_b}} & 0 & \cdots & \cdots \\ \cdots & \cdots & \cdots & \cdots \\ \frac{g_{Q1}}{g_{QQ}^{\beta_m} \cdot g_{11}^{\beta_b}} & \cdots & \cdots & 0 \end{bmatrix} \quad (27)$$

Figure 3:
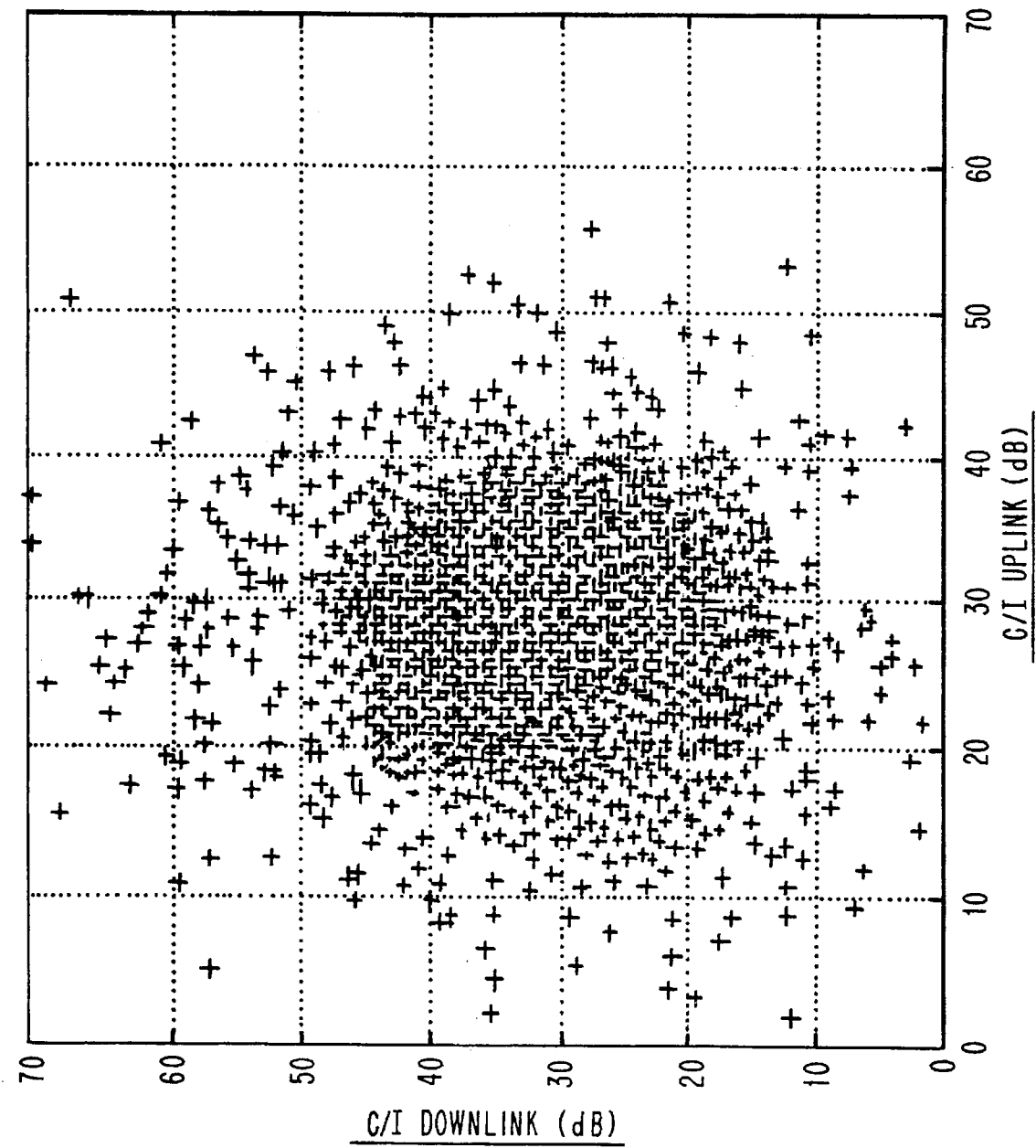
FIG. 3 is a scatter plot of uplink and downlink C/I values on the same connection for each of a number of connections in a communication system to which the present invention applies.

Comparing Eqs. (27) and (23), it is clear that the uplink C/I of connection j is equal to 1 divided by the column sum of column j in the matrix D. Similarly, comparing Eqs. (27) and (24), it is clear that the downlink C/I of connection i is equal to 1 divided by the row sum of the row i. The correlations between the up- and downlink C/I values in the own link are small. This can be seen in Eq. (27) where the matrix D has zeros along the diagonal. This implies that the sum of row i (reciprocal of C/I in the downlink) and the sum of column i (reciprocal of C/I in the uplink) have no term in common. FIG. 3 shows a scatter plot of the C/I in the uplink and the C/I in the downlink. In the figure, each "dot" corresponds to a pair of up- and downlink C/I values for the same connection. It can be seen that the cloud of dots are almost circular, which implies that the up- and downlink C/I values of the same connection have very little correlation to one another.

Figure 4:
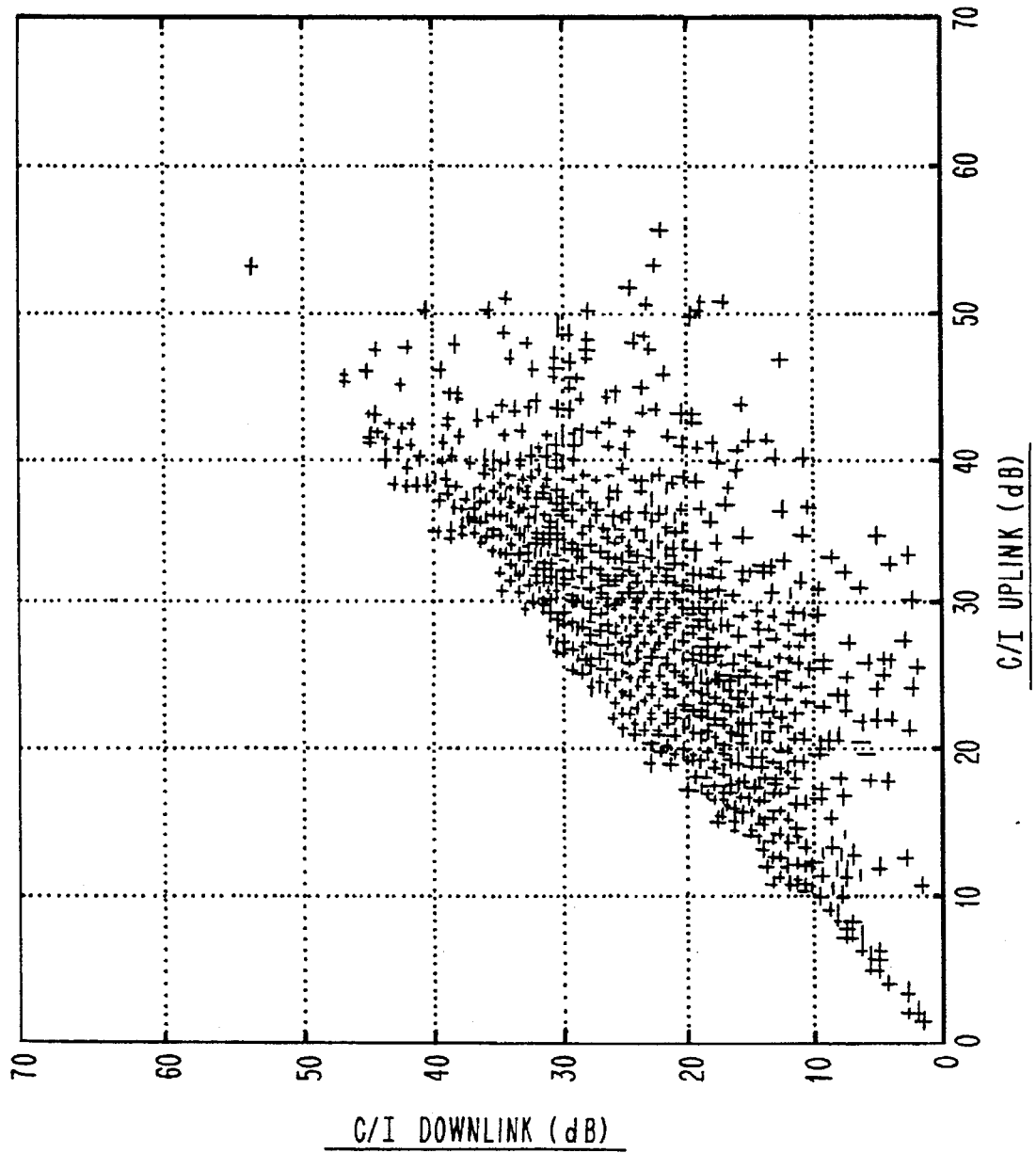
FIG. 4 is a scatter plot showing the correlation between an uplink C/I value on a first connection and a downlink C/I value on a second connection when power regulation is applied in accordance with the present invention.

By contrast, there is a correlation between the uplink C/I value of one connection and the downlink C/I value of another connection. For example assume that the column sum of column j (uplink connection j) is dominated by element i,j in the matrix D. This element also belongs to row i (downlink connection i). Consequently there will be a correlation between the uplink C/I value of connection j and the downlink C/I value of connection i. The scatterplot of FIG. 4 helps illustrate this fact. In the figure, which is derived from a realistic simulation of interference in a cellular system, the uplink C/I value for each connection j is plotted against the downlink C/I value that corresponds to the index, for example i, of the largest element in the column j of the matrix D. If the largest element, i, in the column j is also dominant in the row i, almost the same C/I value will be obtained in the base station j as in the mobile station i. The dots on the diagonal in FIG. 4 correspond to those cases where there is a dominant crosslink term between column j and row i. The dots below the diagonal correspond to cases where the downlink C/I value is lower than the uplink C/I value. This happens when the element in column j that dominates the uplink C/I value is not dominant in the row i. That is, there is some other element in row i that is larger than the largest element of column j and the C/I in the downlink is therefore lower than the uplink C/I.

The above analysis has demonstrated why, for channels having more than two connections, it is generally not possible to find a relation between $\beta_b$ and $\beta_m$ that guaranties that one uplink C/I value will exactly match one of the downlink C/I values. However, the present invention is most concerned with channels having low values of C/I (i.e., those channels having high levels of interference), Because a low value of C/I in a particular uplink indicates that a strong crosslink is present which decreases the C/I, it is reasonable to assume that the effect of this one strong crosslink dominates over the effect of other crosslinks. Because of the dominance of one strong crosslink over others in the system, the analysis of the multiconnection case reduces to the two link case that was discussed in detail above. Therefore, even in the general case with many connections per channel, those channels having low C/I values exhibit strong correlation between uplink and downlink values when power is regulated in a manner that satisfies Eq. (10). Alternatively, for systems in which the power regulation scheme given by Eqs. (21) and (22) is not followed, channels having low C/I values exhibit strong correlation between uplink and downlink values when power is regulated in whatever manner is necessary to satisfy Eq. (16) (i.e., to ensure that, for any given cell, a change in that cell's path gain for a connection is substantially offset by a change in total transmission power for that connection in that cell).

This observation forms the foundation for the inventive ACA technique. First, power is regulated throughout the system, in accordance with Eq. (16). Where power regulation is of the form given by Eqs. (21) and (22), this may be achieved by ensuring that Eq. (10) is substantially satisfied. (Exact compliance with Eq. (10) is not necessary. However, the closer one comes to such satisfaction, the stronger the correlation between uplink and downlink C/I values that can be induced.) While this power regulation scheme is in effect, an ACA algorithm is applied that relies solely on uplink measurements. Because of the correlation between uplink and downlink C/I values that is produced by the power regulation aspect of the invention, the quality of connections is kept high in the downlink connections as well as in the uplink connections.

A preferred ACA scheme for use in the present invention will now be described. As mentioned in the BACKGROUND section of this disclosure, an ACA method has two purposes: 1) eliminate the frequency planning and 2) increase the capacity in the system. The preferred ACA scheme also contains two parts that can be used separately or together.

The first part of the ACA scheme is a frequency reallocation (FRA) method that generates a slowly changing frequency plan. Initially, each base station is allocated a number of channels equal to the number of transceivers at the base station and the combiners are tuned to these frequencies. Then, during operation of the communication system, each base station measures the interference on its own channels and on candidate channels. Based on a long-term average (e.g., in the range of one hour up to several weeks) of these measurements, each base station slowly changes its set of allocated channels, using a strategy that allocates to the base station those channels whose long term average interference measurements are acceptable.

Given a set of frequencies allocated to a particular base station (either preplanned or obtained from an FRA method as described above) the next task is to assign channels from this set to mobile stations that are actively making calls in the cell. In the first generation of cellular systems, the channel allocation scheme consisted simply of determining which channel had been idle for the longest time, and then assigning that channel to the mobile station, provided that some very low quality criteria was fulfilled.

This early channel allocation plan left much to be desired. To understand how it can be improved upon, consider a system with 15 transceivers per base station and a traffic load corresponding to 2% blocking. Then, on average, only 9 of the 15 transceivers are busy. Further, although the average C/I (uplink and downlink) in the system is well above a desired quality threshold, some of the mobile stations and base stations experience much lower C/I values. By avoiding use of the worst channels in each base station, considerable improvements can be achieved for the connections with the lowest quality. Therefore, when a new mobile station is to be assigned a channel (either as a result of the mobile station initiating a new call or as a result of a handover from another base station), the second part of the preferred ACA scheme is a Quality Driven Channel Selection (QDCS) method that assigns the free channel having the best C/I value to the new mobile station entering the cell. The quality of the ongoing connection is also monitored during the time the mobile station is within the cell. If the quality deteriorates, then an intra-cell handover is performed so that one of the available channels having better quality will be assigned to the mobile station.

The above-described QDCS method cannot, in general, be applied to systems using analog channels because only uplink measurements are available in such a system. Without knowledge of the downlink interference levels, the determinations of quality could result in poor choices. For example, consider the situation illustrated in FIG. 5, in which two cells are shown, each having a respective base station $BS_1$, $BS_2$ located in the vicinity of a cell border, and communicating with respective mobile stations $MS_1$, $MS_2$ by means of directional antennas. The second mobile station MS$_2$ may experience significant interference on a given channel emanating from the first base station BS$_1$. However, if the second base station BS$_2$ attempts to determine the quality of this channel based only on uplink measurements, the interference from cell 1 will go undetected because these transmissions are being made from "behind" the second base station's directional antenna. Consequently, the second base station's determination that the channel is of good quality due to the lack of detected uplink interference would be erroneous.

The above-described problem is not limited to the situation in which base stations using directional antennas are located on the periphery of cells. This is because similar "directional" effects can be produced, for example, by topographical features in cells having centrally located base stations using omni-directional antennas, as illustrated in FIG. 1. Thus, in any type of cellular system, a QDCS method cannot be based solely on uplink measurements of interference without any further procedures in place to ensure that the uplink measurements are truly representative of interference on the downlinks as well.

The present invention solves this problem by using a particular power regulation scheme to cause a correlation between up- and downlink C/I values to exist in the system. In particular, a preferred embodiment of the present invention comprises the system-wide regulation of mobile station transmission power (see Eq. 2) and base station transmission power (see Eq. 3) in a manner such that the equation $\beta_b+\beta_m=1$ is substantially satisfied. (Although acceptable results may be achieved by regulating power in a manner such that the sum of $\beta_b$ plus $\beta_m$ is equal to a predetermined constant other than 1, the closer one gets to satisfying the situation where the predetermined constant is equal to 1, the better.) With this power regulation in place, a correlation between uplink and downlink C/I values is assured, so that a QDCS method can be applied, based solely on uplink interference measurements on idle channels, and interference values calculated from C/I measurements on used channels within the base station.

Techniques for making both uplink and downlink interference measurements are well known in the art, and are not described here in great detail. Essentially, for an idle channel, what is measured is signal strength of the channel. This signal strength measurement may be used directly as a measure of interference, because it is this signal energy that would interfere with the cell's own use of the channel. Although, strictly speaking, a cell does not actually experience interference if the channel is not actively used in the cell, the measured level of "expected interference" will henceforth be referred to simply as "interference" in this description.

A technique for measuring interference on an unused channel has just been described. If, however, the channel is in use by the measuring cell, then the level of interference cannot be measured directly. Instead, a C/I measurement is made, using known techniques. Since the measuring cell also knows the strength of the carrier signal (C) that it is using, it is a simple matter to determine the level of interference (I) that caused the measured C/I value.

Figure 6A:
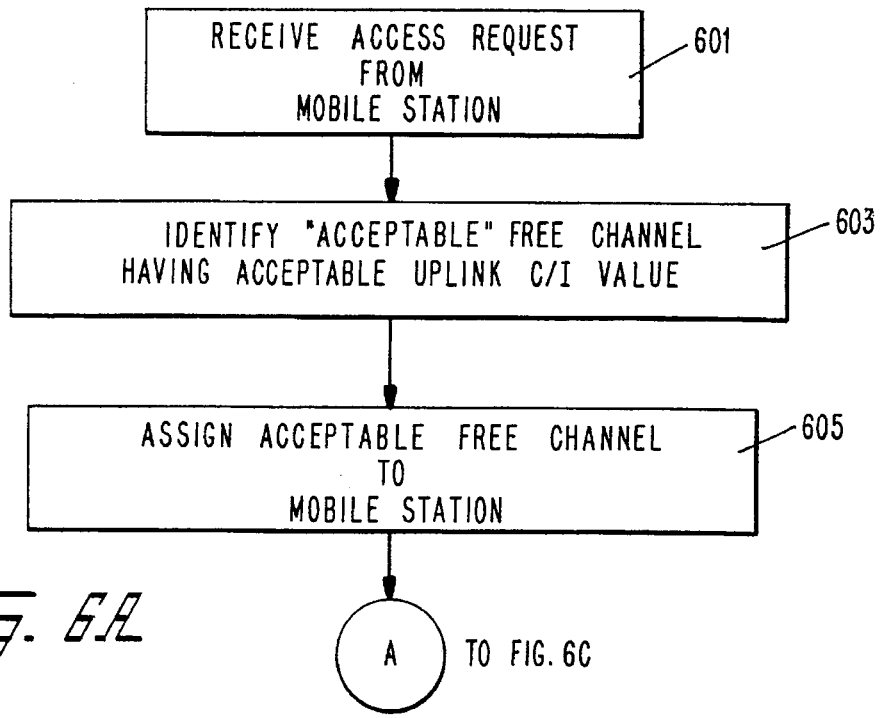
FIGS. 6A–6C are flow charts of an adaptive channel allocation method in accordance with a preferred embodiment of the present invention.
Figure 6B:
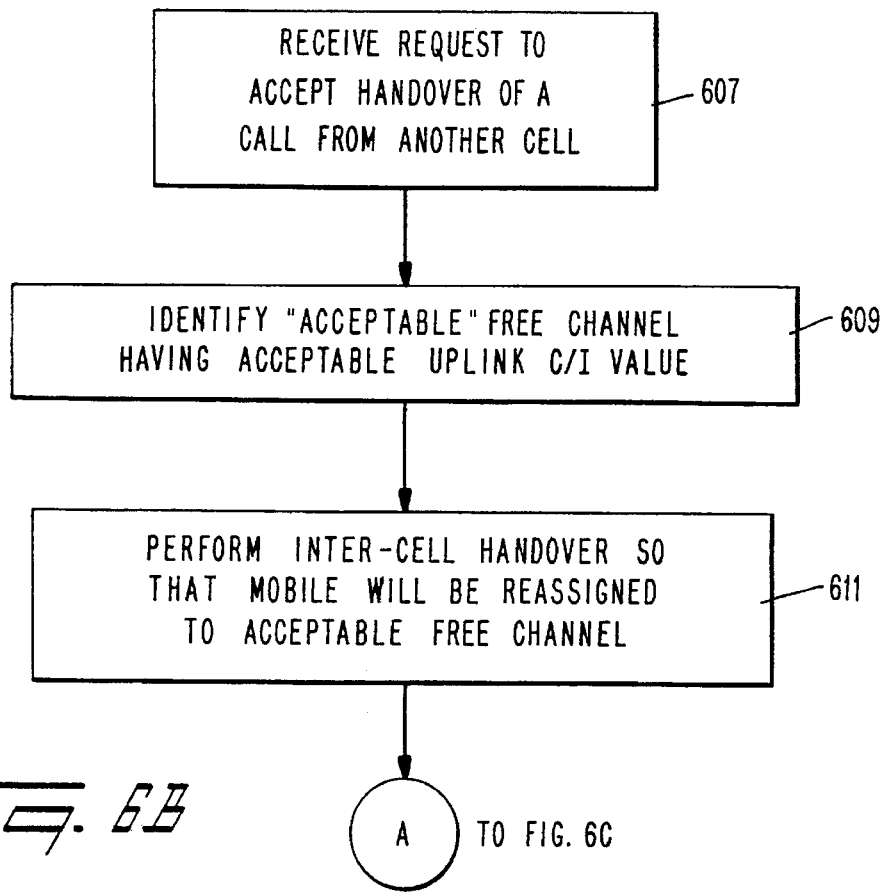
Figure 6C:
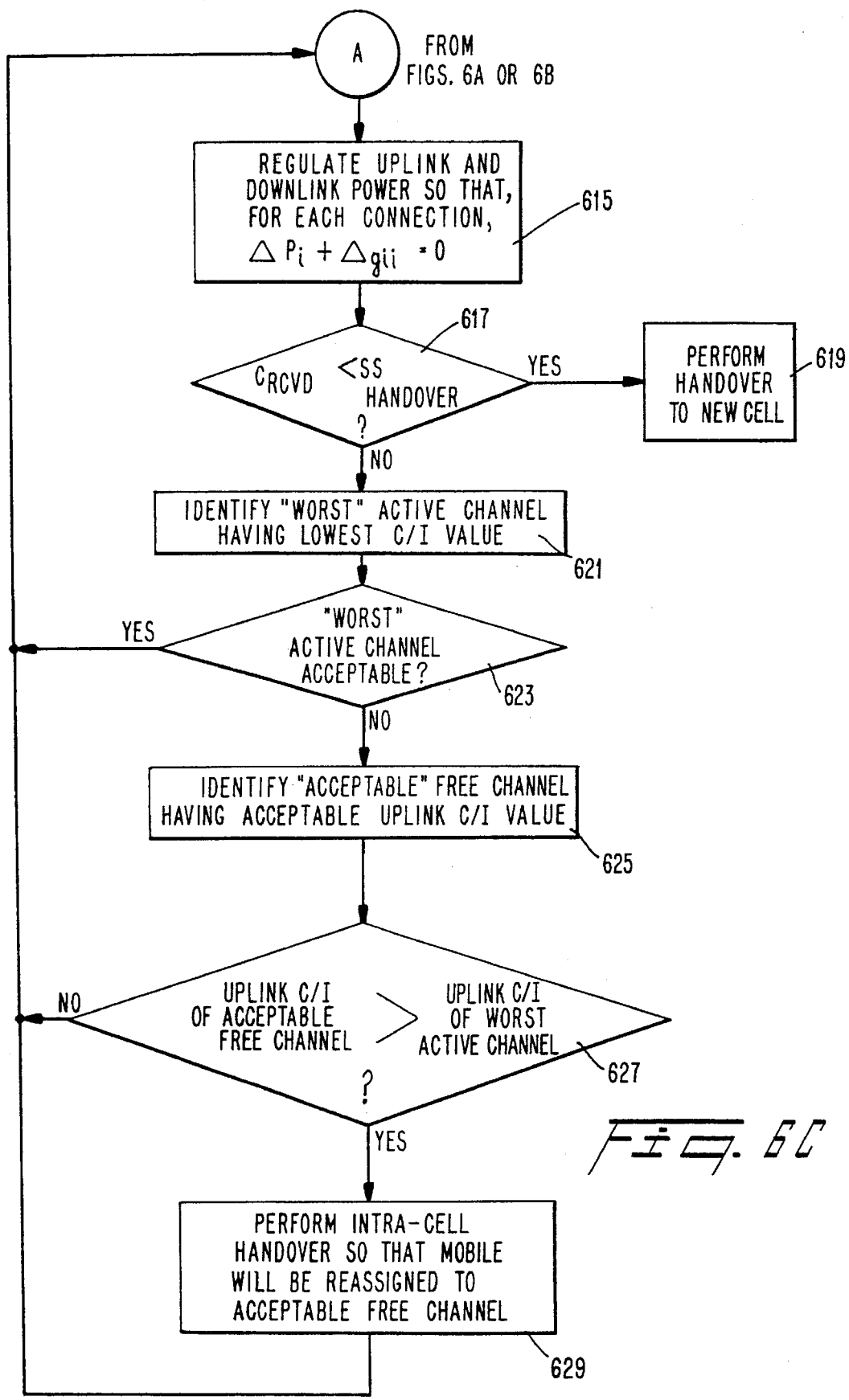

A preferred embodiment of the present invention is illustrated in the flowcharts of FIGS. 6A–6C. Looking first at FIG. 6A, in step 601 a cell has received a request from a mobile station to initiate a new call (i.e., connection). Consequently, it is necessary to allocate a channel for the new connection. In accordance with the invention, an expected uplink C/I value is determined for each of those channels that are assigned to the base station but not currently being used on a connection (i.e., the "free" channels). That is, an interference value for these free channels may be directly measured. An expected C/I value for the call may then be estimated, using an estimate of what the new connection's carrier signal strength will be. A free channel having a level of interference that will give a C/I that falls in a predetermined interval is then identified, and designated as an "acceptable" free channel (step 603). The predetermined interval is a range of C/I values, such as 10 dB and higher, that would be acceptable for a connection. In an alternative embodiment of the invention, the acceptable free channel is, in fact, a "best" one of the free channels that has the highest C/I value of all of the free channels.

Then, the mobile station's connection is assigned to the acceptable (or "best") free channel (step 605). Execution continues with the flowchart of FIG. 6C, which is described below.

Turning first to FIG. 6B, this corresponds to the case where a cell has received a request from (e.g., from an MSC) to accept a handover of a call from another cell. This situation is very much like that described above with respect to FIG. 6A, since it is necessary to allocate a channel for the "new" (i.e., handed over) connection. In accordance with this aspect of the invention, at step 607 an expected uplink C/I value is determined for each of the free channels for this base station. This is done in the same manner as that described above with respect to step 603. A free channel having a level of interference that will give a C/I that falls in a predetermined interval is then identified, and designated as an "acceptable" free channel (step 603). Again, the predetermined interval is a range of C/I values, such as 10 dB and higher, that would be acceptable for a connection. In an alternative embodiment of the invention, the acceptable free channel is, in fact, a "best" one of the free channels that has the highest C/I value of all of the free channels.

Then, an inter-cell handover operation is performed, in accordance with well-known procedures, so that the mobile station's connection is reassigned to the acceptable (or "best") free channel (step 611). Execution continues with the steps depicted in FIG. 6C.

The quality of ongoing connections (such as those established by means of the procedures represented by FIGS. 6A and 6B) may be maintained at a high level in accordance with another aspect of the invention, which will now be described with reference to FIG. 6C. The flowchart of FIG. 6C shows the steps to be performed repeatedly, such as once per second, in each base station within a communication system. First, for each of the existing connections, base station (i.e., downlink) and mobile station (i.e., uplink) power is regulated so as to substantially satisfy Eq. (16) (step 615). In a preferred embodiment of the invention, power is regulated in accordance with Eqs. (21) and (22), so step 615 is performed by substantially satisfying the equation $\beta_b+\beta_m=1$.

Next, for each connection, the strength of the received carrier signal ($C_{RCVD}$) is compared to a signal strength threshold level ($SS_{HANDOVER}$) that represents a minimum level that is required for the cell to continue serving this connection. If, at decision 617, the received carrier signal strength on any connection is less than the value $SS_{HANDOVER}$, then execution continues by performing a handover procedure (step 619). Most of the steps of the handover procedure are well-known, and need not be described here in detail. However, in accordance with the above-described aspect of the invention, the handover procedure additionally includes the steps depicted in FIG. 6B.

If, at decision 617, the received carrier signal strength for a connection is greater than or equal to the value $SS_{HAN}$ DOVER, then for that connection execution continues at step 621, in which the base station measures the uplink C/I value associated with each of the channels that are currently in use on a connection (i e., "active channels"). The measured values are then compared with one another, and the active channel having the lowest C/I value is identified, and designated the "worst active channel".

At decision 623, the C/I value of the worst active channel is tested to determine whether it is in an acceptable range for the connection. For example, an acceptable range might be designated as being 10 dB and above. If the worst active channel has an acceptable uplink C/I value, then nothing further needs to be done, and the loop is repeated by again executing step 615. However, if the worst active channel has an unacceptable uplink C/I value, then execution continues at step 625.

It is noted at this point that in an alternative embodiment of the invention, a strategy is adopted wherein an attempt is always made to improve the performance of the worst channel. In this case, step 623 is skipped, and execution unconditionally proceeds from step 621 to step 625.

At step 625, an expected uplink C/I value is determined for each of those channels that are assigned to the base station but not currently being used on a connection (i.e., the "free" channels). That is, an interference value for these free channels may be directly measured. An expected C/I value for the call may then be calculated, using the knowledge of what the worst active channel's carrier signal strength is. A free channel having a level of interference that will give a C/I that falls in a predetermined interval is then identified, and designated as an "acceptable" free channel. As before, the predetermined interval is a range of C/I values, such as 10 dB and above, that would be acceptable for a connection. In an alternative embodiment of the invention, the acceptable free channel is, in fact, that one of the free channels having the highest C/I value of all of the free channels. This alternative is especially useful in embodiments that skip step 623. In such embodiments, an attempt is always made to improve a worst active channel by trying to locate a "best" free channel.

In any of the above-described embodiments of the invention, the uplink C/I value of the designated acceptable (or alternatively "best") free channel is then compared with the uplink C/I value of the worst active channel (decision 627). If a higher C/I value exists on the acceptable (or "best") free channel than is currently measured on the worst active channel, then an intra-cell handover is initiated so that the mobile station's connection will be reassigned to the acceptable (or "best") free channel (step 629). The loop is then repeated by starting again at step 615.

If, at decision 627, the uplink C/I value of the acceptable (or "best") free channel is not greater than the uplink C/I value of the worst active channel, then the quality of the worst active channel cannot be improved upon., and the loop is merely repeated by starting again at step 615.

A simulation of the inventive ACA method was performed in order to investigate the efficacy of this approach. The simulation presupposed a pre-planned system with clusters according to a 4/12 pattern (i.e., a system having 12 cells per cluster, with 4 antenna sites per cluster). A total of 16 such clusters were arranged on a toroid like surface, that is, for each base station there were 15 cochannel sites surrounding the base station. In this simulated system a traffic realization corresponding to a traffic load of 10 Erlang/cell was generated. It was further assumed that the mobile stations were uniformly distributed throughout the system. Given this static situation, an investigation of different radio resource allocation methods was performed, including one that corresponds to the present invention. Some of the simulation parameters are summarized in table 1.

TABLE 1

| | |
|---|---|
| cluster size | 4/12 |
| number of base stations | 12*16 = 192 |
| total number of channels | 180 |
| transceivers per base station | 15 |
| traffic load | 10 Erlang/cell |
| propagation constant | 4 |
| log-normal fading with standard deviation | 6 dB |

In the simulation, each mobile station was assigned to that base station for which the path loss was a minimum (i.e., the strongest received base station). Next channels were assigned to the mobile stations in accordance with the 4/12 frequency plan. The channels were chosen randomly from the set of channels allocated to each base station. The resulting situation therefore simulated a system state that would be obtained by a first generation system using fixed channel assignment. In some cells the number of mobile stations were larger than the number of allocated channels, so that some mobile station were not assigned a channel (i.e., their calls were blocked).

With the simulated system initialized as described above, the following simple channel reassignment strategy was then applied. First, for each base station, the mobile terminal having the lowest C/I value was identified. Next, each base station compared the calculated interference value of the channel having the lowest C/I value with the uplink interference value on its best free channel. If the interference on the best free channel was lower than on the channel currently assigned to the mobile, then an intra-cell handover was performed. This strategy was performed by all of the base stations in a round robin fashion. The simulation allowed five reassignments per base station.

Figure 7:
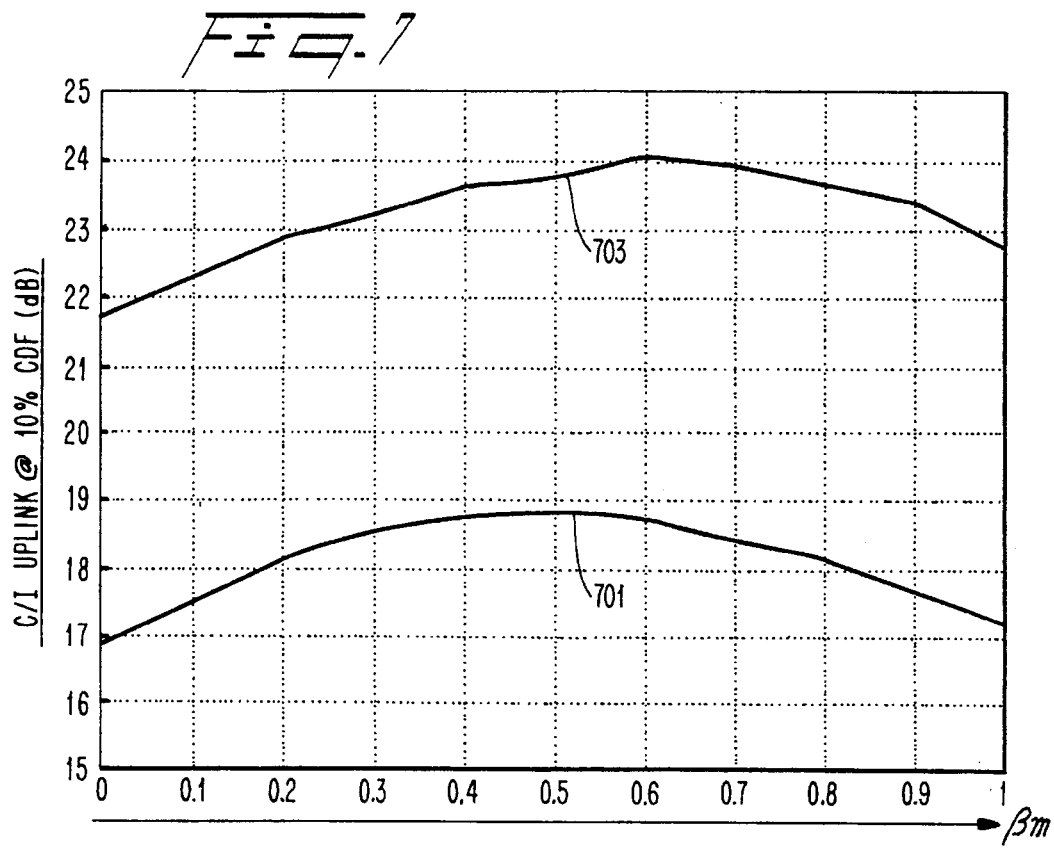
FIG. 7 is a graph showing the simulated effects of the inventive techniques on system uplink interference.

For the reasons explained above, the C/I in the system will depend on the power control method that is used. In the simulations, different values of $\beta_m$ (see Eq. (21), which expresses uplink power control) were used, while $\beta_b=0$ (i.e., constant power in the downlink; see Eq. (22)) was used for all cases. For each value of $\beta_m$, the Cumulative Density Function (CDF) of C/I values was estimated. FIG. 7 shows several graphs of the uplink C/I value at the 10% level (i.e., that C/I value for which no more than 10% of the mobiles have a lesser value) plotted as a function of $\beta_m$. The lower curve 701 shows the resulting curve for the first random channel assignment (i.e., before any reassignment has taken place). Without any reassignment, the best performance was obtained for $\beta_m=0.5$. The upper curve 703 shows the resulting curve after five reassignments per base station were made, in accordance with the ACA method described above. It can be seen that the best performance in this instance was achieved for $\beta_m=0.6$ and that the 10% level was increased by approximately 5 dB.

Figure 8:
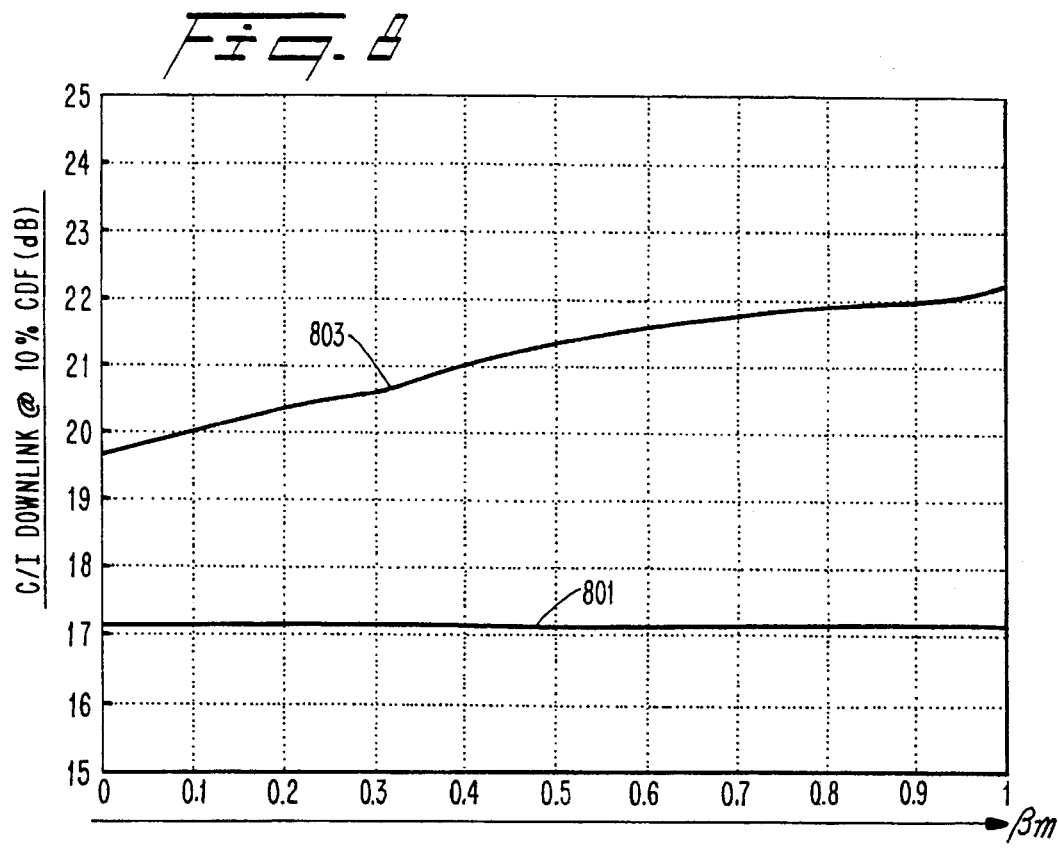
FIG. 8 is a graph showing the simulated effects of the inventive techniques on system downlink interference.

Of even greater interest is the performance in the downlink, since the reassignments were only based on uplink measurements. FIG. 8 is a graph of the 10% level for the downlink as a function of the power control used in the uplink. The lower curve 801 shows the resulting curve for the first random channel assignment (i.e., before any reassignment had taken place). It can be seen from this curve that performance in the downlink without any reassignments was independent of the power control in the uplink. The upper curve 803 shows the 10% C/I level after five reassignments were made in each base station. For no power control ($\beta_m=0$), the improvement was almost 3 dB, and with full power control ($\beta_m$=1) the improvement in the 10% level was more than 5 dB. Thus, it can be seen that the channel reassignment strategy was more effective at improving system performance when the sum of $\beta_m$ and $\beta_b$ approached a value of 1. This result was expected from the analysis presented above.

Figure 9:
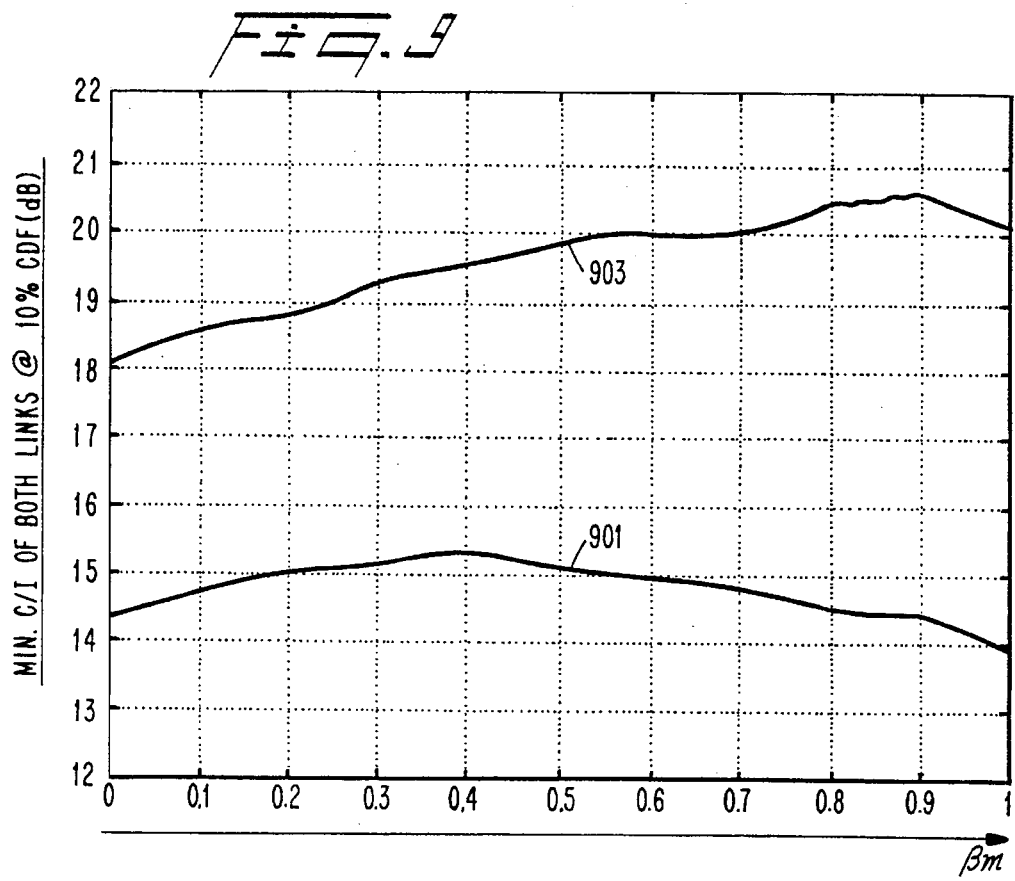
FIG. 9 is a graph showing the simulated effects of the inventive techniques on system interference levels, when both uplink and downlink interference are considered.

Whether a connection is successful or not depends on the C/I values in both the uplink and downlink directions for the connection. It is therefore worthwhile to examine the distribution of the minimum C/I per connection, regardless of whether that minimum occurs on the uplink or on the downlink. FIG. 9 shows the minimum C/I at the 10% level as a function of the power control used in the uplink. As with the other graphs, the lower curve 901 shows the resulting curve for the first random channel assignment (i.e., before any reassignment has taken place), and the upper curve 903 shows the minimum C/I value at the 10% level after five reassignments were made in each base station. It can be seen that, after 5 reassignments, the best performance was obtained for values of $\beta_m$ close to 1, and that the reassignment strategy, after five iterations, increased the 10% level from about 14 dB to 20 dB.

The above analysis has focussed on the influence of the power control in the uplink, since $\beta_b$ was set equal to zero for all of the above cases. Similar results can also be derived for different combinations of up and downlink power control. The reason for investigating the uplink power control together with constant power in the downlink is that this is most similar to the analog systems presently in operation.

To get a simulation even more like the actual situation in a system like AMPS or TACS the influence of discrete power levels was also investigated. In those systems, the mobile stations cannot be controlled over a continuum of power levels, but instead only have a few power levels to chose from. Furthermore, the process of changing power levels is rather slow in these systems.

Figure 10:
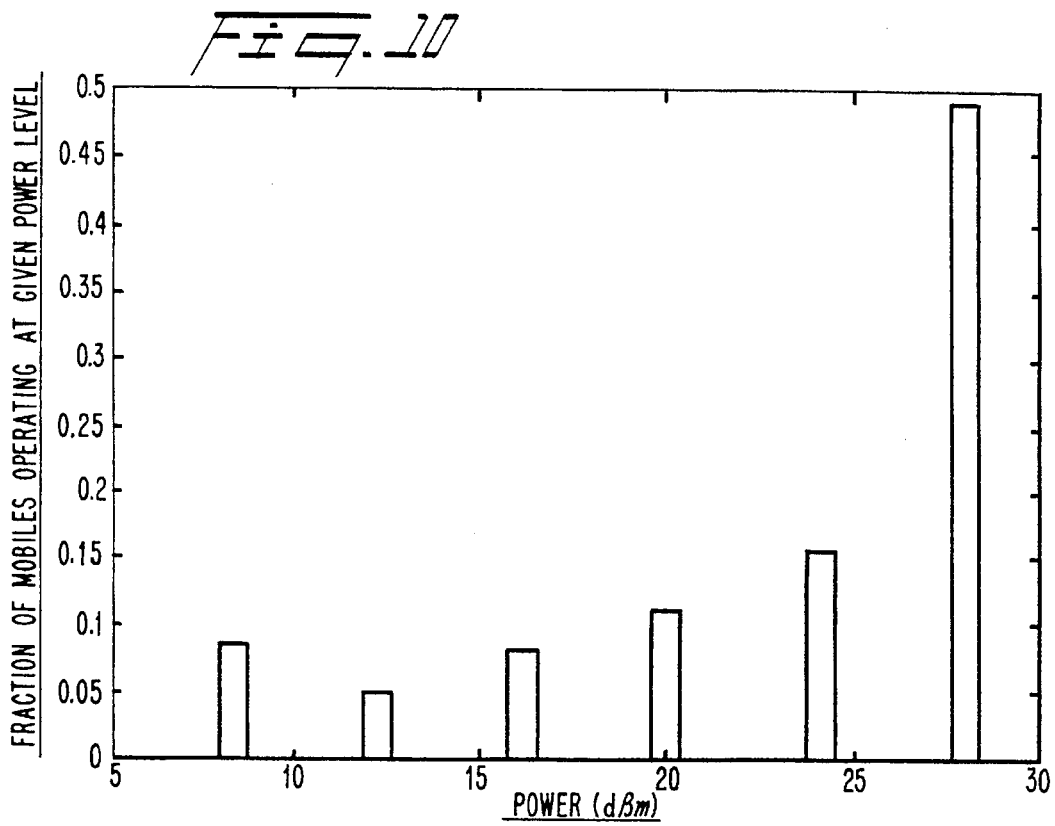
FIG. 10 is a histogram showing the obtained power level distribution for class 3 AMPS (hand-held) mobile stations in another simulation of the present invention.

To get a realistic situation for the simulated snapshot traffic situation, the desired power level was calculated for each mobile station with $\beta m$=1. Then, in order to model the presence of errors that arise from discrete and slow decisions having been made, an error amount, $\epsilon_{Power}$, was added and the obtained power values were rounded towards the closest available power level. The values for $\epsilon_{power}$ were selected from a triangular distribution of error amounts $\epsilon_{Power} \in [-4,4]$ (in dB). FIG. 10 shows a histogram of the obtained power level distribution for class 3 AMPS mobile stations (handheld). For these power levels the rearrangement gains are given in Table 2. Looking at the results of the minimum of both the up- and downlinks, it can be seen that the reassignment gain is 5 dB compared to 6 dB for perfect power control. Thus, the inventive technique yields significant improvements even in systems such as AMPS and TACS, where the mobile can only be controlled among discrete power levels.

TABLE 2

| | 0 iterations | 5 iterations |
|---|---|---|
| 10% level uplink [dB] | 18.0 | 23.1 |
| 10% level downlink [dB] | 17.1 | 21.0 |
| 10% level min of both links [dB] | 14.7 | 19.6 |

The above results show significant improvements that were achieved in the simulated system. When applying the inventive ACA technique to a real system, however, a number of limitations are introduced. First, the interference situation does not remain static, but rather changes due to movement of mobile stations, the addition of new mobile stations to the system and the removal of some mobile stations from the system. The inventive ACA method relies on the ability to observe changing interference situations, but one must accept the fact that, at least for the present, some of the interference measurements will be old and therefore inaccurate.

Additional limitations on the implementation of the inventive ACA method result from system-imposed constraints on the number of power adjustments and intracell handovers that can be performed per time unit. Such constraints on the number of changes that can be performed arise for a number of reasons, including the fact that signalling to the mobile stations affects the speech quality, and should therefore be minimized. Furthermore, the computing capacity of the Mobile Switching Centers (MSC) is also limited. Nonetheless, the simulation of the imperfect power control shows that even for this case, high capacity gains are feasible.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. In a cellular communication system comprising first and second cells, wherein the first cell comprises a first base station and a first mobile station, and the second cell comprises a second base station and a second mobile station, and wherein further the second cell uses any one of a plurality of channels on a second connection between the second base station and a second mobile station, a method for allocating one of the plurality of channels for use on a first connection between the first base station and the first mobile station, the method comprising the steps of:

in the second cell, adjusting total power of the used one of the channels by an amount $\Delta P_2$, wherein:

$\Delta P_2$ is equal to a sum of a change in transmission power of the second mobile station plus a change in transmission power of the second base station on the used one of the channels;

$\Delta P_2$ has a magnitude that is substantially equal to a magnitude of a change in path gain between the second mobile station and the second base station; and $\Delta P_2$ has a sign that is opposite a sign of the change in path gain between the second mobile station and the second base station;

in the first cell, using determinations of uplink interference values to select an acceptable free channel from those ones of the plurality of channels that are unused in the first cell; and in the first cell, allocating the acceptable free channel to the first connection.

2. The method of claim 1, further comprising the steps of:

initially allocating a first one of the plurality of channels to the first connection; and if the acceptable free channel is not the first one of the plurality of channels, then performing an intracell handover of the first connection from the first one of the plurality of channels to the acceptable free channel.

3. The method of claim 1, wherein the step of selecting an acceptable free channel comprises the steps of:

determining an acceptable set of free channels having respective expected uplink C/I ratios that are within a predetermined range of C/I values; and selecting, as the acceptable free channel, one of the free channels from the acceptable set of free channels.

4. The method of claim 3, wherein the step of selecting, as the acceptable free channel, one of the free channels from the acceptable set of free channels, comprises selecting, as the acceptable free channel, a best free channel from the acceptable set of free channels, wherein the best free channel has a highest expected C/I ratio compared to other expected C/I ratios of respective other free channels in the acceptable set of free channels.

5. The method of claim 1, wherein the step of adjusting total power in the second cell comprises the steps of:

(a) regulating power, $P_{m2}$, in the second mobile station so that $$P_{m2}=\alpha_m-\beta_m \cdot g_{22} \ [dB],$$

where $g_{22}$ is the path gain between the second mobile station and the second base station, and $\alpha_m$ and $\beta_m$ are constants;

(b) regulating power, $P_{b2}$, in the second base station so that $$P_{b2}=\alpha_b-\beta_b \cdot g_{22} \ [dB],$$

where $\alpha_b$ and $\beta_b$ are constants; and (c) while performing steps (a)–(b), ensuring that a sum of $\beta_b$ plus $\beta_m$ is equal to a predetermined constant.

6. The method of claim 5, wherein the predetermined constant is 1.

7. In a cellular communication system comprising first and second cells, wherein the first cell comprises a first base station and a first mobile station, and the second cell comprises a second base station and a second mobile station, and wherein further the second cell uses any one of a plurality of channels on a second connection between the second base station and a second mobile station, an apparatus for allocating one of the plurality of channels for use on a first connection between the first base station and the first mobile station, the apparatus comprising:

means for adjusting total power of the used one of the channels in the second cell by an amount $\Delta P_2$, wherein:

$\Delta P_2$ is equal to a sum of a change in transmission power of the second mobile station plus a change in transmission power of the second base station on the used one of the channels;

$\Delta P_2$ has a magnitude that is substantially equal to a magnitude of a change in path gain between the second mobile station and the second base station; and $\Delta P_2$ has a sign that is opposite a sign of the change in path gain between the second mobile station and the second base station;

means for using determinations of uplink interference values collected in the first cell to select an acceptable free channel from those ones of the plurality of channels that are unused in the first cell; and means for allocating the acceptable free channel to the first connection in the first cell.

8. The apparatus of claim 7, further comprising:

means for initially allocating a first one of the plurality of channels to the first connection; and handover means for performing an intra-cell handover of the first connection from the first one of the plurality of channels to the acceptable free channel if the acceptable free channel is not the first one of the plurality of channels.

9. The apparatus of claim 7, wherein the means for using determinations of uplink interference values collected in the first cell to select the acceptable free channel comprises:

means for determining an acceptable set of free channels having respective expected uplink C/I ratios that are within a predetermined range of C/I values; and means for selecting, as the acceptable free channel, one of the free channels from the acceptable set of free channels.

10. The apparatus of claim 9, wherein the means for selecting, as the acceptable free channel, one of the free channels from the acceptable set of free channels comprises means for selecting, as the acceptable free channel, a best free channel from the acceptable set of free channels, wherein the best free channel has a highest expected C/I ratio compared to other expected C/I ratios of respective other free channels in the acceptable set of free channels.

11. The apparatus of claim 7, wherein the means for adjusting total power of the used one of the channels in the second cell comprises:

(a) mobile power regulating means for regulating power, $P_{m2}$, in the second mobile station so that $$P_{m2}=\alpha_m-\beta_m \cdot g_{22} \ [dB],$$

where $g_{22}$ is the path gain between the second mobile station and the second base station, and $\alpha_m$ and $\beta_m$ are constants;

(b) base station power regulating means for regulating power, $P_{b2}$, in the second base station so that $$P_{b2}=\alpha_b-\beta_b \cdot g_{22} \ [dB],$$

where $\alpha_b$ and $\beta_b$ are constants; and (c) control means for ensuring, during operation of the mobile power regulating means and the base station power regulating means, that a sum of $\beta_b$ plus $\beta_m$ is equal to a predetermined constant.

12. The apparatus of claim 11, wherein the predetermined constant is 1.

* * * * *